May 22, 1956 L. T. SELLSTROM 2,746,268
SELF-REFRIGERATED HIGHWAY TRUCK
Filed Jan. 14, 1955 4 Sheets-Sheet 1
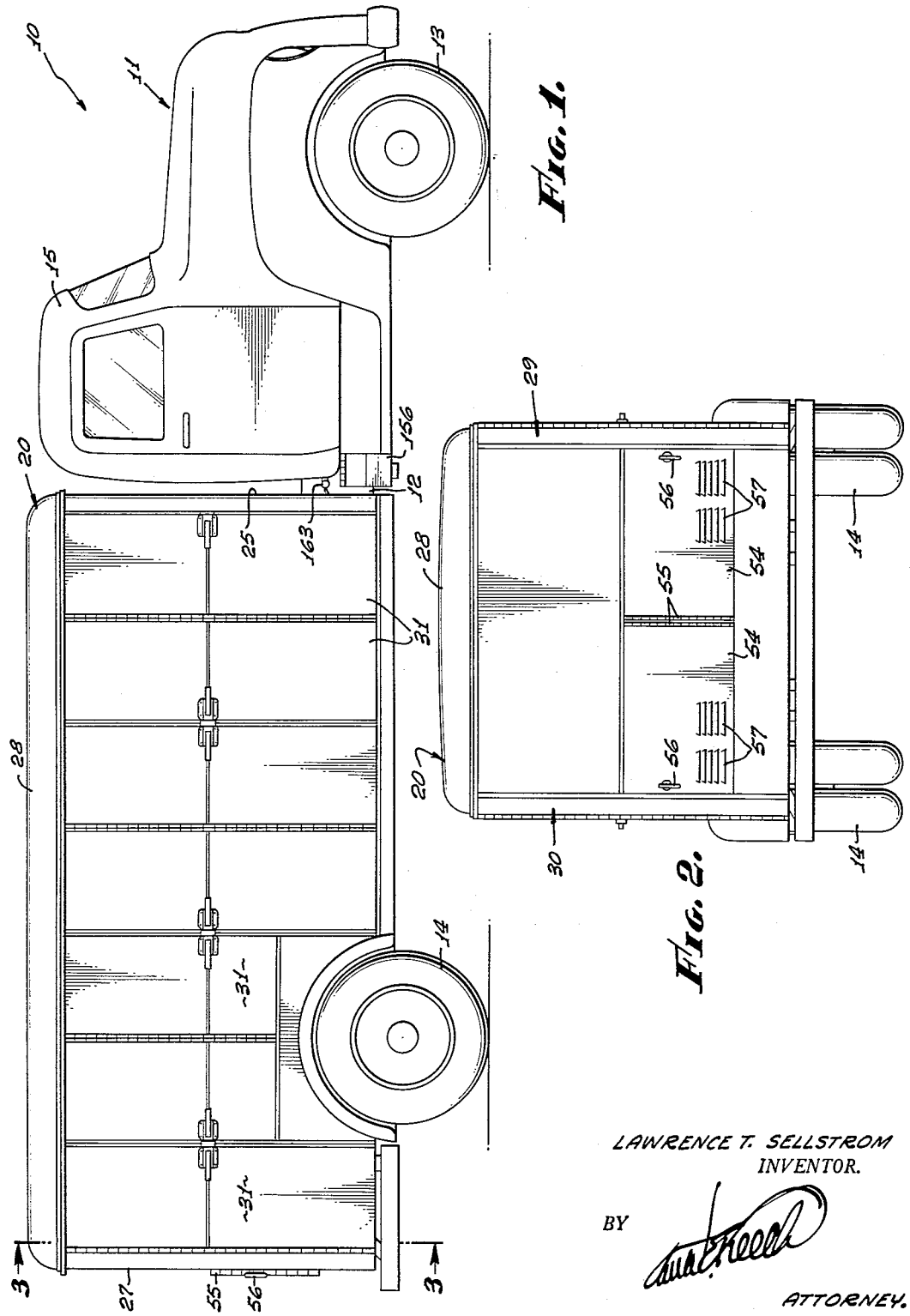
LAWRENCE T. SELLSTROM
INVENTOR.
BY
ATTORNEY.

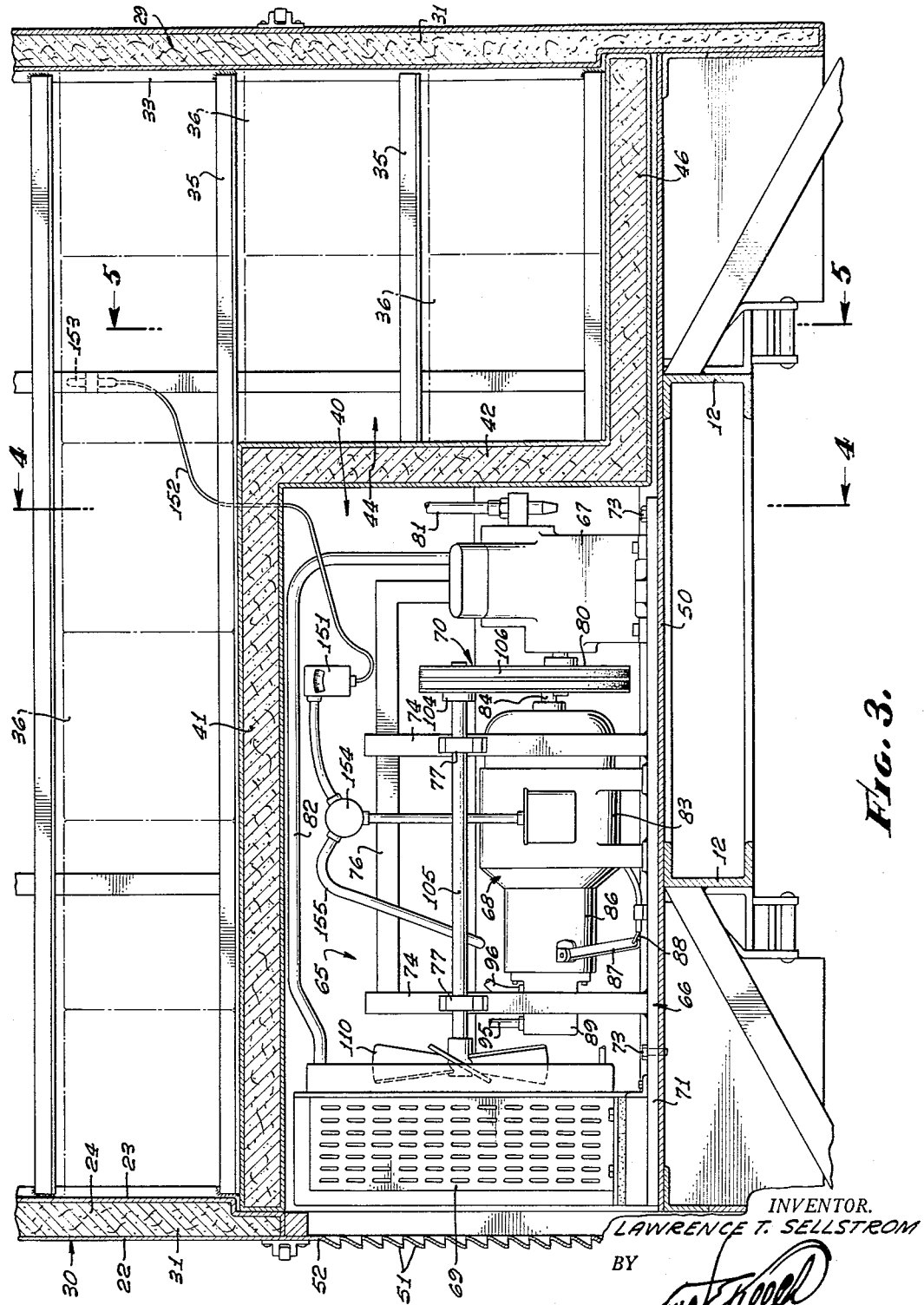

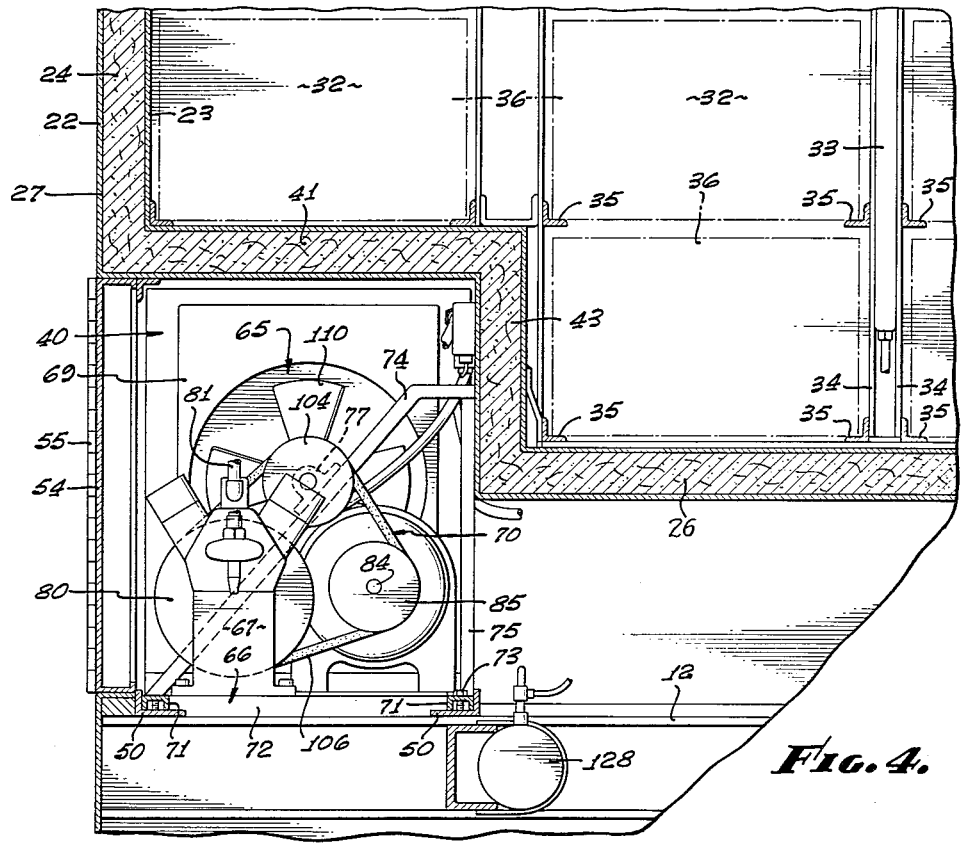
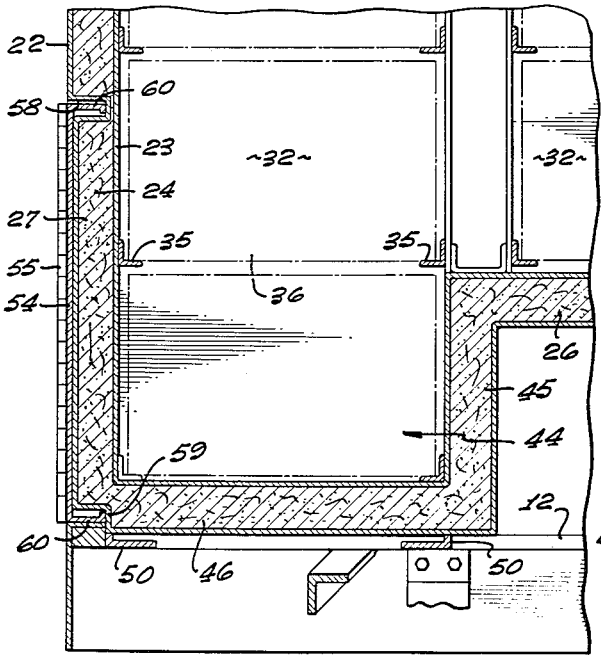
Fig. 4.
Fig. 5.
INVENTOR.
LAWRENCE T. SELLSTROM
BY
ATTORNEY.

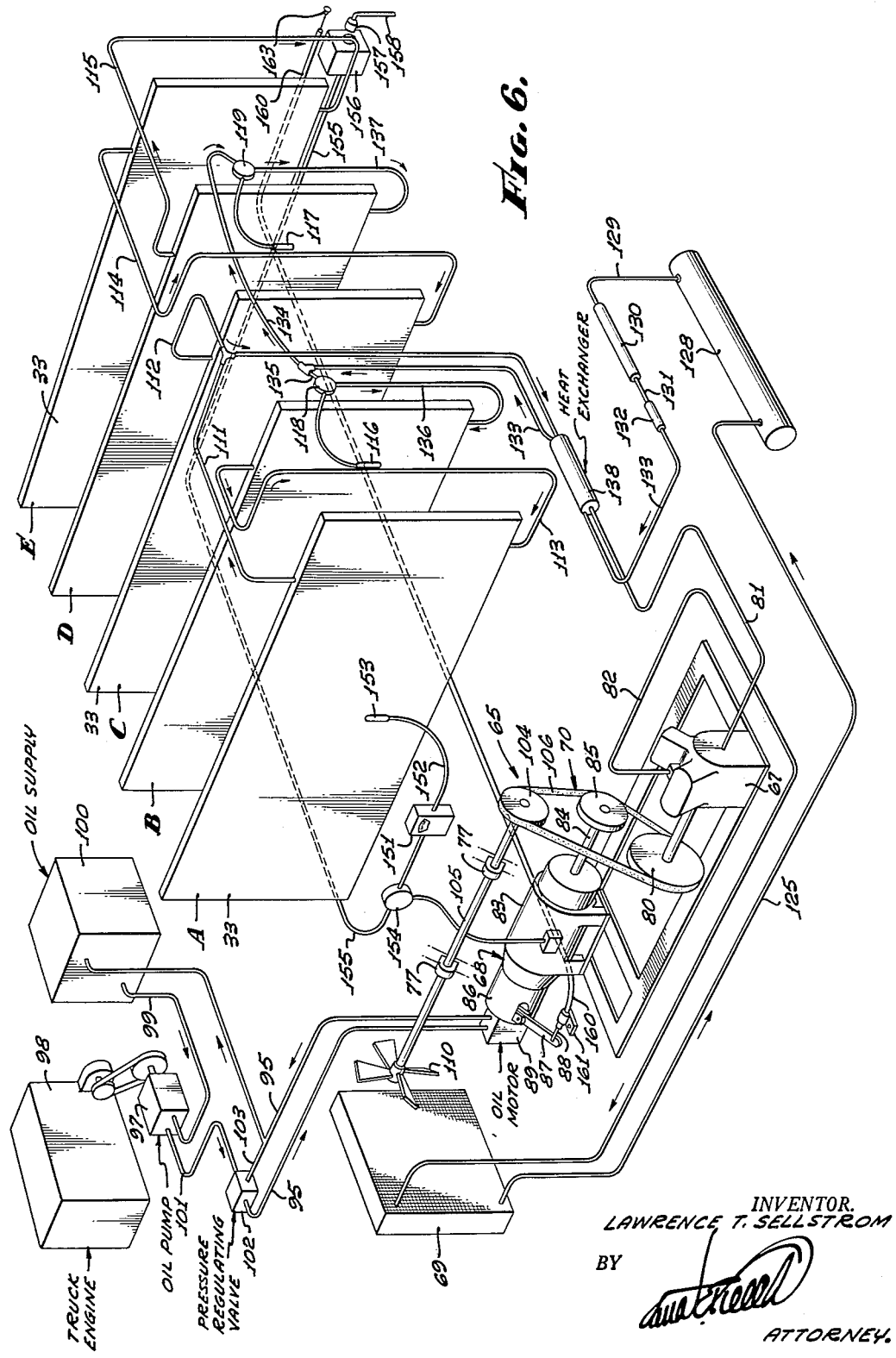

United States Patent Office 2,746,268
Patented May 22, 1956

2,746,268

SELF-REFRIGERATED HIGHWAY TRUCK

Lawrence T. Sellstrom, Los Angeles, Calif., assignor to Knudsen Creamery Co. of California, Los Angeles, Calif., a corporation of California Application January 14, 1955, Serial No. 481,842

1 Claim. (Cl. 62—117.1)

This invention relates to highway transport trucks which have self-contained refrigeration systems.

The problem to the solution of which the present invention is directed is the refrigeration of a particular type of refrigerated truck body to which standard truck refrigerating units are, for one reason or another, inapplicable. This truck body is internally divided into transverse compartments, access to the opposite ends of each of which is had through full height doors hingedly mounted in the side walls of the truck. Each compartment has spaced pairs of angle iron tracks at different levels therein to receive cases of fresh products to be transported by said truck. This type of truck is particularly useful in the wholesale distribution of dairy products.

The body of this truck is necessarily set low on the chassis and does not extend upward beyond a level where cases may be conveniently delivered to and removed from the uppermost tracks by the driver while he stands on the ground. To give the truck body the necessary capacity, a maximum use of the cargo space in the body is required.

One solution of this problem is disclosed in my U. S. Letters Patent No. 2,667,761 showing a self-contained refrigeration system the power unit of which occupies an angled recess partitioned off from the rest of the body and occupying the space at the rear lower corner of the truck body, this recess extending entirely across the latter. The power unit in the patented structure is driven by a small internal combustion engine. Although satisfactory otherwise, this engine had the faults of being noisy, of creating quite a bit of heat, and of giving off fumes of combustion and sometimes fumes of the fuel itself.

The present invention is directed towards providing an improved refrigeration system for a self-refrigerated highway truck of the type above described.

Another object is to provide such a system having a power unit which is relatively compact thereby allowing a substantial part of the space previously required for the power unit to be utilized as cargo carrying space.

A further object of the invention is to provide such a refrigerating system in which the power unit is odorless and quiet, and releases only relatively small amounts of heat when operating.

A yet further object of the invention is to provide such a refrigerating system in which the power unit thereof is driven by the engine of the truck itself, thereby eliminating the need of a separate power plant.

Still another object of the invention is to provide such a refrigerating system which is optionally operable by the truck engine or by an electric motor which may be energized through a service cord from a standard electric power outlet at the place for storing the truck.

The manner of accomplishing the foregoing objects as well as further objects and advantages will be made manifest in the following description taken in connection with the accompanying drawings in which:

Fig. 1 is a diagrammatic side elevational view of a refrigerated truck embodying the invention.

Fig. 2 is a rear elevational view of said truck.

Fig. 3 is an enlarged fragmentary cross sectional view taken on the line 3—3 of Fig. 1 and shows how the left rear lower corner portion of the refrigerator body is formed to provide a recess for housing the power unit of the refrigeration system, the right rear lower corner portion of said body being used as refrigerated cargo space.

Fig. 4 is a fragmentary vertical sectional view taken on the line 4—4 of Fig. 3 and shows the manner of forming the insulating wall of the left lower rear corner of the truck body to fit around the power unit of the refrigerating system.

Fig. 5 is a fragmentary vertical sectional view taken on the line 5—5 of Fig. 3 and shows the manner of forming the refrigerator body in that portion of the right rear lower corner of the latter which is not needed for the power unit and which is therefore available for use as refrigerated cargo space.

Fig. 6 is a diagrammatic perspective view illustrating the refrigerating system of the invention.

Referring specifically to the drawings, the invention is there shown as embodied in a self-refrigerated highway truck 10 having an automotive chassis 11 including a frame 12 mounted on front wheels 13 and rear drive wheels 14 and having a driver's cabin 15 for accommodating the driver of the truck. The truck 10 also includes a refrigerated body 20 which comprises a rectangular cold box, all the walls of which are formed of spaced sheets of metal 22 and 23, the space between which is filled with heat insulating material 24 (Fig. 4). The walls of box 20 include a front wall 25 (Fig. 1), a bottom wall 26 (Fig. 4), a rear wall 27, a top wall 28 and side walls 29 and 30.

The side walls 29 and 30 are formed by a series of narrow, full-height doors 31 which are hingedly mounted back to back along adjacent vertical edges to cover closely spaced vertical door openings formed in the side walls 29 and 30. The door openings thus formed in side wall 29 are directly opposite corresponding door openings in side wall 30, thereby providing ready access separately to either end of each of a series of transverse compartments 32 into which the interior of cold box 20 is divided by a series of cold plates 33 (Fig. 4). These plates are supported by vertical bars 34, the latter being connected by horizontal pairs of angle irons 35 which act as supporting rails for cases 36 of uniform size in which the product is packed for conveniently loading the same into and removing it from the truck 10.

In order to accommodate the axle structure on which the rear drive wheels 14 are mounted, the bottom wall 26 is higher, by approximately the height of a single case 36, in the two compartments 32 disposed over wheels 14. This causes the doors 31 for these two compartments to be correspondingly shorter than the other doors 31.

Formed in the lower left rear corner of the cold box 20 is a refrigerant compressing unit recess 40 which is produced by a lower left corner portion of rear wall 27 being omitted and by uniting the edges of the shortened portion of said wall with a horizontal wall 41 and a vertical wall 42. The front edges of walls 41 and 42 connect with a vertical wall 43 which is united with the rear end of the bottom wall 26 of the cold box 20 as shown in Fig. 4.

The space within the cold box 20 located just to the right of the recess 40 (Figs. 3 and 5) comprises a cargo storage space 44 which is added to the right rear compartment 32 and is enclosed by the rear right door 31 of said compartment, by the vertical wall 42, by the rear wall 27 (Fig. 5), by a vertical wall 45 which extends downwardly from the rear edge of the bottom wall 26, and by a horizontal wall 46 which connects the lower edges of walls 27, 42 and 45. The storage space 44 is thus seen to accommodate four cargo cases 36.

The bottom of compressing unit housing recess 40 (Fig. 3) is open and is provided with a pair of heavy parallel transverse angle members 50 which are mounted directly on the chassis frame 12. The left rearmost door 31 of the cold box 20 has the insulating structure thereof omitted from the lower portion thereof where this door covers the left or outer end of the recess 40. The lower portion of this door has louvers 51 formed in the outer metal wall 52 thereof so as to permit air to pass therethrough and thus ventilate recess 40.

The rear end of recess 40 is open and is normally covered by a pair of sheet metal doors 54—54. These are mounted at their inner edges on hinges 55 and have locking handles 56 for holding them closed, but permitting these doors to be opened when access to recess 40 is desired. Ventilation louvers 57 are provided in the doors 53 and 54 which are symmetrically formed for the purposes of maintaining the external symmetry of the truck 10.

Louvers 57 in the door 54 perform no function and it is necessary to shape the outer sheet metal layer 22 of rear cold box wall 27 to form a channel 58 and an angle 59 to receive upper and lower flanges 60 which are bent inwardly from the sheet metal door 54 for reinforcing purposes.

Mounted in the recess 40 is a refrigerant compressing unit 65 which includes a frame 66, a refrigerant compressor 67, a compound motor 68, a refrigerant condenser 69 and a transmission 70 for connecting the compound motor 68 with the compressor 67.

The frame 66 includes longitudinal inverted channel members 71 which are connected by cross bars 72, the members 71 being secured to truck frame angle members 50 by cap screws 73. Welded to the members 71 are sloping members 74 and vertical members 75 which are united at their upper ends and connected by the longitudinal bar 76. Mounted on the sloping bars 74 are self-aligning bearings 77.

The compressor 67 is of the reciprocating piston type, is mounted directly on the frame cross bars 72, and has a drive pulley 80. The compressor 67 receives fluid refrigerant through a tube 81 and discharges the refrigerant under high pressure to a tube 82.

The compound motor 68 includes an electric motor 83 which is mounted directly on the frame channel member 71 and has a shaft 84 on one end of which is fixed a pulley 85 which is radially aligned with the compressor pulley 80. Fixed on the opposite end of the electric motor 83 is a clutch 86 having a shifting lever 87, the latter being controlled by a Bowden cable 88. Mounted on the shell of the clutch 86 is a fluid motor 89 which is aligned with the shaft 84 of electric motor 83 and is optionally connected with said shaft by clutch 86 by manipulation of lever 87 through cable 88. Motor 89 is preferably a hydraulic motor and is connected as shown in Fig. 6 through pressure and return lines 95 and 96 with an oil pump 97 which is driven in any desired manner by the trunk engine 98. The pump 97 draws oil through a suction line 99 from an oil supply reservoir 100 and discharges this through a pressure line 101 leading to a pressure regulating valve 102 from which pressure line 95 leads to the oil motor 89, and a by-pass line 103 connects said valvet with the motor return line 96 which discharges into the oil supply reservoir 100.

The transmission 70 includes the pulleys 80 and 85 and a pulley 104 mounted on a jack shaft 105 which journals in bearings 77, and a double endless V-belt 106 which is trained about and provides a drive connection between pulleys 80, 85 and 104 (Figs. 3 and 4).

The axis of shaft 105 passes approximately through the center of condenser 69, and a fan 110 is mounted on said shaft adjacent said condenser so as to be rotated by the transmission 70 and thus set up a current of air through the condenser 69 for cooling the same.

Tube 82 connects the discharge end of the compressor 67 to the upper end of condenser 69 while the intake side of compressor 67 is connected by tube 81 and branch tubes 111 and 112 with the upper edges of cold plates 33 which are identified as cold plates A, and C, out of a series A, B, C, D,, and E of said cold plates which are embodied in the structure of the cold box 20. The lower edge of cold plate A is connected by a tube 113 with the upper edge of cold plate B while the lower edge of cold plate C is connected by a tube 114 with the upper edge of cold plate E. The lower edge of cold plate E is connected by a tube 115 with the upper edge of cold plate D. Cold plates B and D are equipped with thermostatic elements 116 and 117 which are connected to and actuate control valve 118 and 119.

The lower end of the condenser 69 (Fig. 6) is connected by a tube 125 to a receiver tank 128, the opposite end of which is connected by a tube 129 with a dryer 130 which is connected by a tube 131 to a sight glass 132, the latter being connected by a tube 133 having branches 134 and 135 to the valves 118 and 119. When the temperature in the cold box 20 is above the given minimum, the thermostatic elements 116 and 117 cause refrigerant delivered through pipes 134 and 135 to valves 118 and 119 to flow therefrom through tubes 136 and 137, respectively, into the lower ends of cold plates B & D.

Tubes 81 and 133 travel parallel to each other through a heat exchanger 138, the purpose of which will be made clear hereinafter.

Secured to the wall 43 (Figs. 3 and 4) is a thermo-responsive electrical switch 151 which is connected by a conduit 152 with a thermostatic element 153 mounted in the dead air space between the two rearmost cargo compartments 32 of the cold box 20 (Fig. 3). The switch 151 includes relays (not shown) for controlling the delivery of electricity to the electrical motor 83 in accordance with the temperature indicated by the thermostatic element 153. The wiring connecting the switch 151 with the motor 83 unites in a junction box 154 from which a conduit 155 leads to an outlet box 156 which is preferably mounted on the frame 12 of the truck 10 between the cabin 15 thereof and the cold box 20. The outlet box 156 has a receptacle into which a plug 157 of a service cord 158 may be inserted for the purpose of energizing the electric supply system of the electric motor 83.

The Bowden cable 88 for controlling the clutch 86 has a coiled wire sleeve 160 opposite ends of which are connected by brackets 161 to the frame of the truck and the front end of which terminates just above the electric outlet box 156 (Figs. 1 and 6) where the cable 88 is provided with a knob 163 for actuating the same and controlling said clutch.

*Operation*

The refrigerated truck 10 is especially designed for the wholesale delivery of fresh dairy products packed in cases 36 in which a substantial order, including a case or more of goods, is generally delivered at each stop. The cases of dairy products thus transported in the truck 10 rest upon the pairs of rails 35 which are provided at corresponding levels in all of the compartments 32. It has been found economical to keep the cargo space of the cold box 20 refrigerated to within a range of temperatures between 29° F. and 40° F. throughout its storage at night so that it will be unnecessary to remove any portion of a load remaining in the cold box 20 at the end of a day's run. The cold box is thus ready to be reloaded at any time during the night with the product to be taken out on the next day's run. It is also fully refrigerated at any time in the morning that the driver is ready to start the day's run.

The refrigerant compressing unit 65 may be optionally operated in either of two ways. The first of these is by energizing electric motor 83 by inserting the plug 157 of the live service cord 158 into the receptacle of the outlet box 156. This mode of operation requires that the clutch 86 first be opened by the manipulation of the Bowden cable 88 through the knob 161 at the end thereof. The energizing of the electric motor 83 after the clutch 86 has been opened drives the compressor 67 through the pulley and belt transmission 70 and also rotates the jack shaft 105 and fan 110 mounted thereon so as to cool the condenser 69. This causes a circulation of the refrigerant through the cold plates 33 and the condenser 69 so as to refrigerate the cold plates until the temperature within the cold box 20 acts through the thermostatic element 153 to break the electric circuit of the electric motor 83, thus temporarily halting the operation of the refrigerant compressing unit 65. When the temperature in the cold box again rises above the maximum, the thermostatic element 153 reacts to this to cause the relays in the switch 151 to start motor 83, thus resuming the operation of compressing unit 65.

The mode of operation just described is that employed during the night when the truck 10 is stored in the quarters provided for servicing the same. The other mode of operation of the unit 65 is to drive the same from the engine 98 of the truck 10 through the oil pump 97 which is directly driven by said engine and the oil motor 89 which is hydraulically connected with said pump. This latter mode of operation is used to maintain the refrigeration of the cold box 20 while the truck is away from its home quarters as when engaged in the delivery of dairy products on a delivery route. Thus, when the driver of the truck 10 gets ready to leave the place where the truck has been stored during the night, he pulls the plug 157 from the outlet box 156, pushes in on the knob 161 to close the clutch 86, thereby connecting the oil motor 89 directly with the shaft 84 of the electric motor 83. The driver then merely needs to start the engine 98 of his truck and proceed with the truck on his delivery route in order for the unit 65 to be driven by the oil motor 89 so long as the truck engine 98 is operating at a speed slightly above idling.

In case the truck 10 is driven at a high speed for a long distance without any stops so that the temperature in the cold box 20 drops below the desired minimum temperature, the thermostatic control elements 116 and 117 cause the valves 118 and 119 to partially close thereby restricting the flow of refrigerant to the cold plates 33. This restriction is ordinarily sufficient to prevent the temperature within the cold box 20 dropping below the minimum while the truck is operating on the highway. Should over-refrigeration occur, the operator can always open the clutch 86 so as to temporarily cut out the actuation of the compressing unit 65 until the temperature within the cold box 20 has risen to the maximum permissible.

The above disclosure of a preferred embodiment of the present invention is believed to make manifest that this invention attains all of the objects recited in the preamble of the specification.

The use of a hydraulic pump-motor connection between the truck engine 98 and the refrigerant compressing unit 65 eliminates all the disadvantages previously experienced in employing a separate internal combustion engine for driving said unit as required in my patented refrigerated truck aforesaid. The hydraulic drive system is odorless and quiet and releases practically no heat when operating as compared with the heat produced by a separate internal combustion engine.

The present invention also eliminates all of the maintenance cares which are involved in the use of a separate internal combustion engine. The present invention also offers great advantages in the simple structure of the compound motor 68 which embodies an electric motor 83, a clutch means 86, and a hydraulic motor 89 which are integrally connected and are supported on the mount of the electric motor 83.

A substantial saving in space is also effected by the present invention whereby room for four additional cases of goods is added to the cargo space of the refrigerated body 20.

The claim is:

In a self-refrigerated highway truck, the combination of: a running chassis; a truck engine mounted on said chassis for propelling the same; a refrigerated body mounted on said chassis, said body being substantially rectangular in form and having an insulated recess formed in the lower rear corner of said body and opening laterally from said body, said recess being separated by walls of insulation from the cargo space within said body, said recess extending from one side of said truck only part way across said body, the balance of the rear lower corner space within said body, constituting a substantial portion thereof, being included in the insulating cargo-carrying space within said body; refrigerant expansion means mounted in said body for cooling cargo carried in said cargo space; a refrigerant compressing unit housed within said recess and connected to said expansion means, said unit including a compressor, an electric motor, clutch means mounted on said electric motor, and a fluid motor mounted on said clutch means, said clutch means constituting an optional drive connection between said electric motor and said fluid motor, said compressing unit also including a refrigerating fluid condenser, said condenser being located at the laterally open end of said housing recess, and means for connecting said motors to said compressor comprising pulley-and-belt means and including a jack shaft driven by said pulley-and-belt means and extending transversely of said body on a line adjacent the center of said condenser; a fan mounted on said jack shaft adjacent said condenser so as to be rotated therewith when the compressing unit is operating to move air through said condenser; a fluid pump mounted to be driven by said truck engine; and means connecting said pump with said fluid motor whereby said refrigerant compressing unit will be driven by said truck engine when said truck is driving on the highway and when said clutch is engaged, but whereby said compressing unit may be driven by said electric motor when said clutch is disengaged and while said truck engine is not running.

References Cited in the file of this patent

UNITED STATES PATENTS

| | | |
|---|---|---|
| 2,227,257 | Henny et al. | Dec. 31, 1940 |
| 2,467,398 | Miller | Apr. 19, 1949 |
| 2,530,241 | Harrington | Nov. 14, 1950 |
| 2,663,163 | Mansmann | Dec. 22, 1953 |
| 2,667,761 | Sellstrom | Feb. 2, 1954 |